US008216099B2

(12) United States Patent
Yang

(10) Patent No.: US 8,216,099 B2
(45) **Date of Patent: *Jul. 10, 2012**

(54) CONTINUOUS VARIABLE TRANSMISSION DEICE WITH HIGH AND LOW SHIFT TRANSMISSION PULLEY TRAINS

(76) Inventor: Tai-Her Yang, Dzan-Hwa (TW)

( * ) Notice: Subject to any disclaimer, the term of this patent is extended or adjusted under 35 U.S.C. 154(b) by 555 days.

This patent is subject to a terminal disclaimer.

(21) Appl. No.: 12/320,386

(22) Filed: Jan. 26, 2009

(65) Prior Publication Data

US 2009/0197714 A1 Aug. 6, 2009

Related U.S. Application Data

(60) Provisional application No. 61/006,831, filed on Feb. 1, 2008.

(51) Int. Cl.
*F16H 59/00* (2006.01)

(52) U.S. Cl. ................. 474/12; 474/17; 474/50; 474/70

(58) Field of Classification Search .................... 474/12, 474/17, 50, 70, 100, 109
See application file for complete search history.

(56) References Cited

U.S. PATENT DOCUMENTS 4,881,925 A * 11/1989 Hattori ............................ 474/18
4,884,997 A * 12/1989 Hattori ............................ 474/28
7,803,075 B2 * 9/2010 Ho .................................... 474/8

* cited by examiner

*Primary Examiner* — Sang Kim
(74) *Attorney, Agent, or Firm* — Bacon & Thomas, PLLC

(57) ABSTRACT

The invention is disclosed by that a high shift transmission pulley train is installed between the input shaft and the output shaft of the continuous variable transmission device, and a clutching device is installed between the output shaft and the driven pulley of the high shift transmission pulley train as well as that a low shift transmission pulley train matching with an unidirectional transmission device is installed between the input shaft and the output shaft of the continuous variable transmission device.

20 Claims, 10 Drawing Sheets

CONTINUOUS VARIABLE TRANSMISSION DEICE WITH HIGH AND LOW SHIFT TRANSMISSION PULLEY TRAINS

BACKGROUND OF THE INVENTION (a) Field of the Invention

The operation schemes of continuous transmission for various known continuous variable transmission device of different shafts include:

The spacing between the variable spacing transmission V-belt grooves of driving and driven pulleys is modulated, whereby the operative belt transmission radial distance of driving pulley or driven pulley is changed to further change the transmission speed ratio between the driving pulley and the driven pulley;

The above said spacing modulation for variable spacing transmission V-belt grooves of driving or driven pulleys of the continuous variable transmission device is required to be driven by one or more than one kinds of axial driving forces including:

1. Through a variable centrifugal force generation mechanism by changes of the rotational speed of the input shaft to generate a variable axial driving force whereby to change the spacing of the transmission V-belt grooves of the driving pulley;

2. Through a variable centrifugal force generating mechanism by changes of the rotational speed of the output shaft to generate a variable axial driving force whereby to change the spacing of the transmission V-belt grooves of the driven pulley;

3. Through a variable axial driving force generating mechanism by changes of the output shaft torque to generate a variable axial driving force whereby to change the spacing of the transmission V-belt grooves of the driving pulley;

4. Through a variable axial driving force generating mechanism by changes of the output shaft torque to generate a variable axial driving force whereby to change the spacing of the transmission V-belt grooves of the driven pulley;

5. The driving or driven pulley is provided an axial pre-pressed spring, whereby the driving or driven pulley is pulled by the belt type transmission component to generate an axial driving force, whereby to change the variable spacing of the transmission V-belt grooves of both or either of the driving or driving pulley;

The above said 1~5 methods are passive operations of continuous variable transmission function.

6. A linear driving force actively generated manually, or by mechanical power, electromagnetic effect, hydraulically or pneumatically driven linear driving device; or a revolving kinetic energy generated by driving the electric motor, hydraulic motor or pneumatic motor is converted through a mechanical transmission device to an axial linear type driving force whereby to further change the spacing of variable spacing transmission V-belt grooves of both or either of the driving pulley or driven pulley. Said method is the active operation of continuous variable transmission.

(b) Description of the Prior Art

Types of conventional continuous variable transmission devices of different input and output shafts structures are numerous including: rubber belt type, metal belt type, chain type, or electronic (ECVT) type, friction disk type or known continuous variable transmission device of different shafts type, etc.

SUMMARY OF THE INVENTION

The continuous variable transmission device with high and low shift transmission pulley trains is passively operated by an axial driving force generated by operating torque or rotational speed controlled manually or by axially pre-pressed springs on the driving and driven pulleys, or actively operated by manual, electric, mechanical, hydraulic or pneumatic powers and further referring to input preset operating modes, detected speeds and torques, etc. thereby to modulate and operate the speed ratio of the continuous variable transmission thereof.

Although the continuous variable transmission device of different shafts type is advantageous in convenient operation for its automatic speed ratio adjustment function according to the rotational speed change of the driving pulley input shaft and the size of loading torque at loading side, said continuous variable transmission device of different shafts type has the imperfections:

1. Due to low transmittable power, it is only suitable for middle to small power applications.

2. Transmission efficiency of the continuous variable transmission device of different shafts type is too low;

3. Durability enhancement is required.

The continuous variable transmission device with high and low shift transmission pulley trains has the following innovative functions:

1. A high shift transmission pulley train of fixed speed ratio are installed between the input shaft and the output shaft of the continuous variable transmission device in the same revolving direction and a clutching device is installed between the output shaft and the driven pulley of the high shift transmission pulley train, wherein if a deceleration type continuous variable transmission device is used to operate at minimum decelerating speed ratio or near minimum decelerating speed ratio status, or if an acceleration type continuous variable transmission device is used to operate at maximum accelerating speed ratio or near maximum accelerating speed ratio status, then the clutching device is operated to close when the input shaft is rotated to or over setting rotational speed, whereby to connect the driven pulley of the high shift transmission pulley train and the output shaft;

2. A low shift transmission pulley train of fixed speed ratio matching and an unidirectional transmission device are installed between the input shaft and the output shaft of the continuous variable transmission device in the same revolving direction, wherein if a deceleration type continuous variable transmission device is used to operate at maximum decelerating speed ratio or near maximum decelerating speed ratio status, or if an acceleration type continuous variable transmission device is used to operate at minimum accelerating speed ratio or near minimum accelerating speed ratio status, then during high load operation, when the rotational speed of driving pulley of the low shift transmission pulley train is lowered to below that of the input shaft in the same revolving directions, revolving kinetic energy of the input shaft is through the unidirectional transmission device and the low shift transmission pulley train to drive the output shaft and further to drive the load, at said status, the transmission power originally transmitted through the continuous variable transmission device of different shafts type is changed to transmit through the low shift transmission pulley train for output.

DESCRIPTION OF MAIN COMPONENT SYMBOLS

Figure 1:
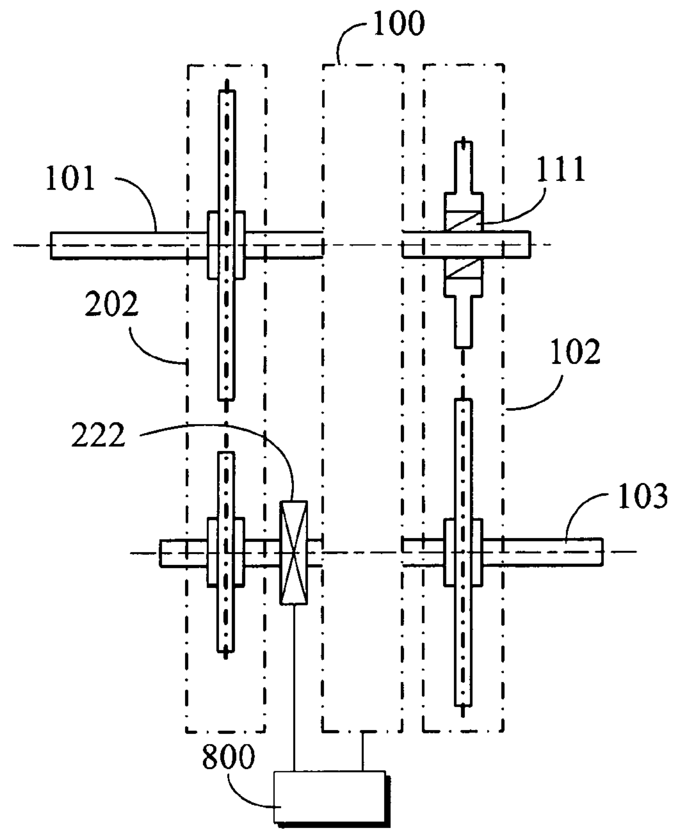
FIG. 1 is one of the embodiment schematic views of the invention constituted by the continuous variable transmission device of different shafts type as well as the high and low shift transmission pulley trains, wherein an radial unidiredtional transmission device is installed between the input shaft and the driving pulley of the low shift transmission pulley train; and a clutching device is installed between the driven pulley of the high shift transmission pulley train and the output shaft which is driven by the driven pulley of the continuous variable transmission device of different shafts type.

100: Continuous variable transmission device of different shafts type
101: Input shaft
102: Low shift transmission pulley train
103: Output shaft
111, 211: Unidirectional transmission device
202: High shift transmission pulley train
212: Torque limiting clutching device
222: Clutching device
302, 402: Speed change pulley train
800: Driving control device

DETAILED DESCRIPTION OF THE PREFERRED EMBODIMENTS

The continuous variable transmission device with high and low shift transmission pulley trains is passively operated by an axial driving force generated by operating torque or rotational speed controlled manually or by axially pre-pressed springs on the driving and driven pulleys, or actively operated by manual, electric, mechanical, hydraulic or pneumatic powers and further referring to input preset operating modes, detected speeds and torques, etc. thereby to modulate and operate the speed ratio of the continuous variable transmission thereof.

Although the continuous variable transmission device of different shafts type is advantageous in convenient operation for its automatic speed ratio adjustment function according to the rotational speed change of the driving pulley input shaft and the size of the loading torque at loading side, said continuous variable transmission device of different shafts type has the imperfections:

1. Due to low transmittable power, it is only suitable for middle to small power applications.
2. Transmission efficiency of the continuous variable transmission device of different shafts type is too low;
3. Durability enhancement is required.

The continuous variable transmission device with high and low shift transmission pulley trains has the following innovative functions:

1. A high shift transmission pulley train of fixed speed ratio is installed between the input shaft and the output shaft of the continuous variable transmission device in the same revolving direction and a clutching device is installed between the output shaft and the driven pulley of the high shift transmission pulley train, wherein if a deceleration type continuous variable transmission device is used to operate at minimum decelerating speed ratio or near minimum decelerating speed ratio status, or if an acceleration type continuous variable transmission device is used to operate at maximum accelerating speed ratio or near maximum accelerating speed ratio status, then the clutching device is operated to close when the input shaft is rotated to or over setting rotational speed, whereby to connect the driven pulley of high shift transmission pulley train and the output shaft;

2. A low shift transmission pulley train of fixed speed ratio and an unidirectional transmission device are installed between the input shaft and the output shaft of the continuous variable transmission device in the same revolving direction, wherein if a deceleration type continuous variable transmission device is used to operate at maximum decelerating speed ratio or near maximum decelerating speed ratio status, or if an acceleration type continuous variable transmission device is used to operate at minimum accelerating speed ratio or near minimum accelerating speed ratio status, then during high load operation, when the rotational speed of the driving pulley of the low shift transmission pulley train is lowered to below that of the input shaft in the same revolving directions, revolving kinetic energy of the input shaft is through the unidirectional transmission device and the low shift transmission pulley train to drive the output shaft and further to drive the load, at said status, the transmission power originally transmitted through the continuous variable transmission device of different shafts type is changed to transmit through the low shift transmission pulley train for output.

The continuous variable transmission device with high and low shift transmission pulley trains comprises:

As shown in FIG. 1, besides the relevant mechanisms in the conventional continuous variable transmission devices, the continuous variable transmission device with high and low shift transmission pulley trains is further mainly constituted by:

A continuous variable transmission device of different shafts type 100: It is a continuous variable transmission device of different input and output shafts structure comprises at least one kind of rubber belt type, metal belt type, chain type, or electronic (ECVT) type, friction disk type continuous variable transmission devices, wherein transmission speed ratio thereof can be either passively automatically modulated by following torque or following rotational speed; or actively modulated by applying a linear driving force either generated by an externally powered linear driving device or by a revolving driving device via mechanical transmission device for conversion to change spacing between the transmission V-belt grooves of both or either of the driving and driven pulley.

Figure 2:
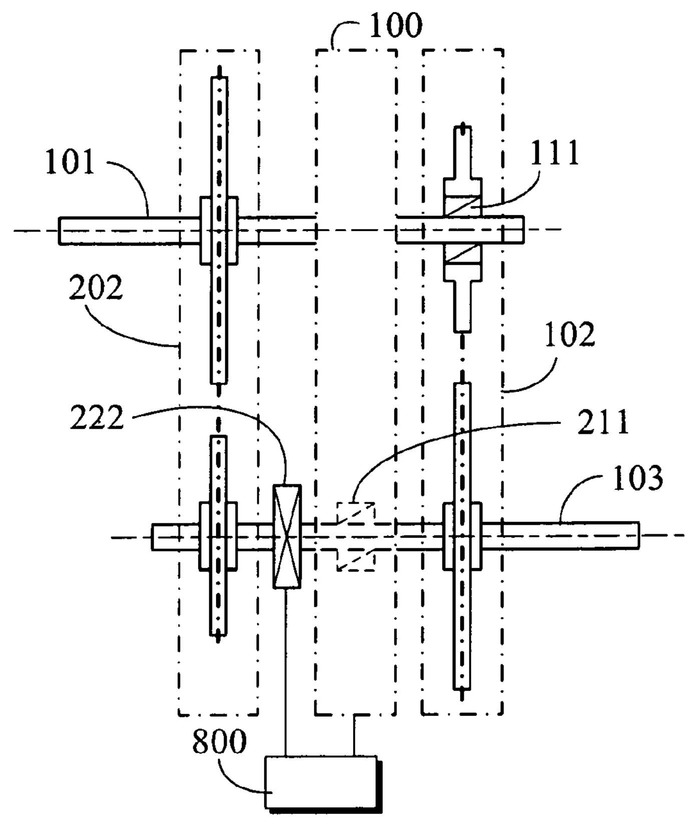
FIG. 2 is the second embodiment schematic view of the invention constituted by the continuous variable transmission device of different shafts type as well as the high and low shift transmission pulley trains, wherein an radial unidiredtional transmission device is installed between the input shaft and the driving pulley of the low shift transmission pulley train; an unidirectional transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 3:
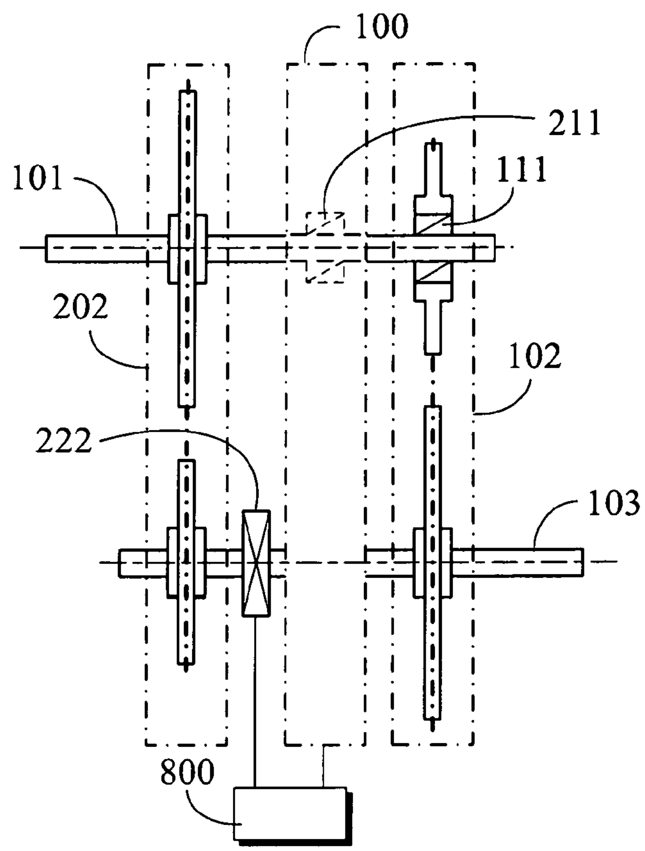
FIG. 3 is the third embodiment schematic view of the invention constituted by the continuous variable transmission device of different shafts type as well as the high and low shift transmission pulley trains, wherein an radial unidiredtional transmission device is installed between the input shaft and the driving pulley of the low shift transmission pulley train; an unidirectional transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 7:
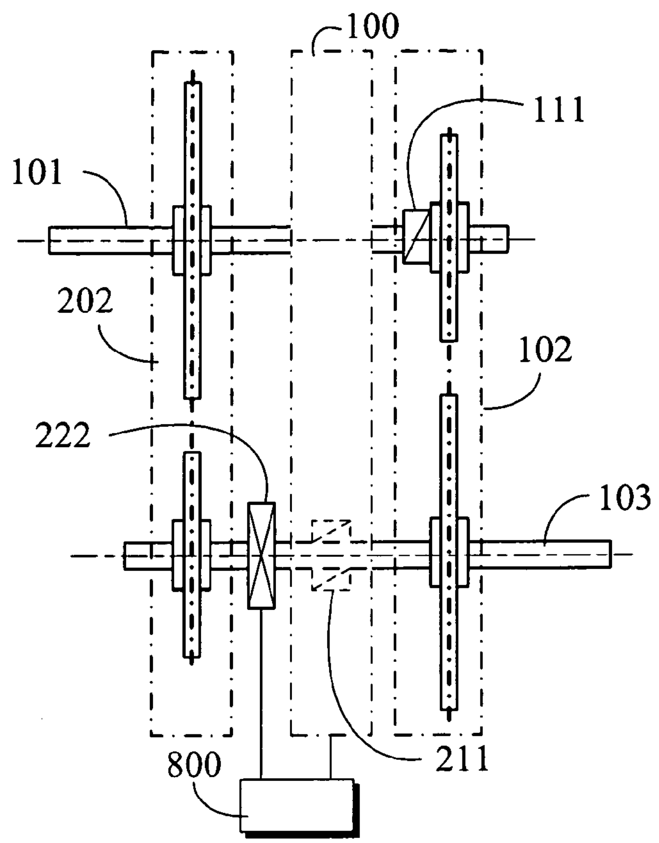
FIG. 7 is the seventh embodiment schematic view of the invention constituted by the continuous variable transmission device of different shafts type as well as the high and low shift transmission pulley trains, wherein an axial unidiredtional transmission device is installed between the input shaft and the driving pulley of the low shift transmission pulley train; an unidirectional transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 8:
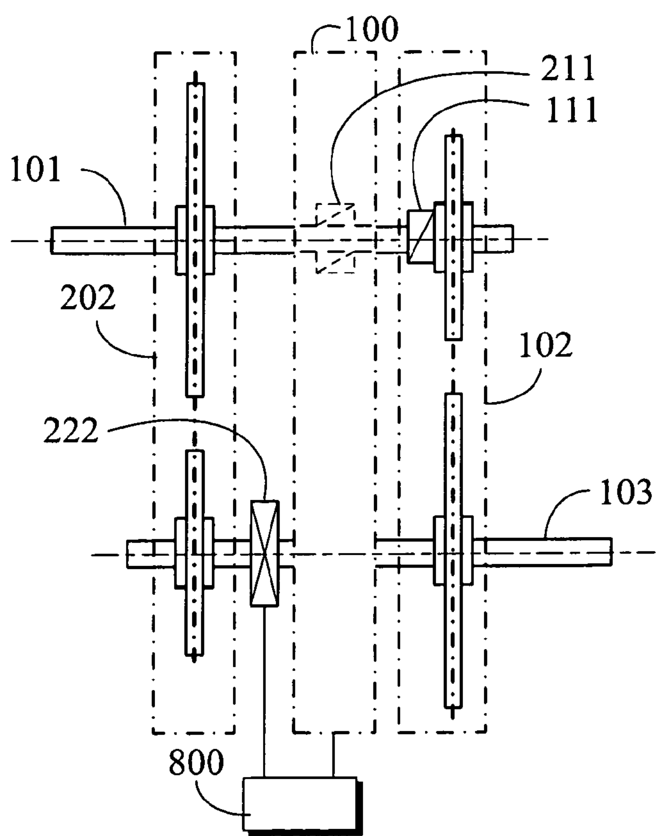
FIG. 8 is the eighth embodiment schematic view of the invention constituted by the continuous variable transmission device of different shafts type as well as the high and low shift transmission pulley trains, wherein an axial unidiredtional transmission device is installed between the input shaft and the driving pulley of the low shift transmission pulley train; an unidirectional transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 12:
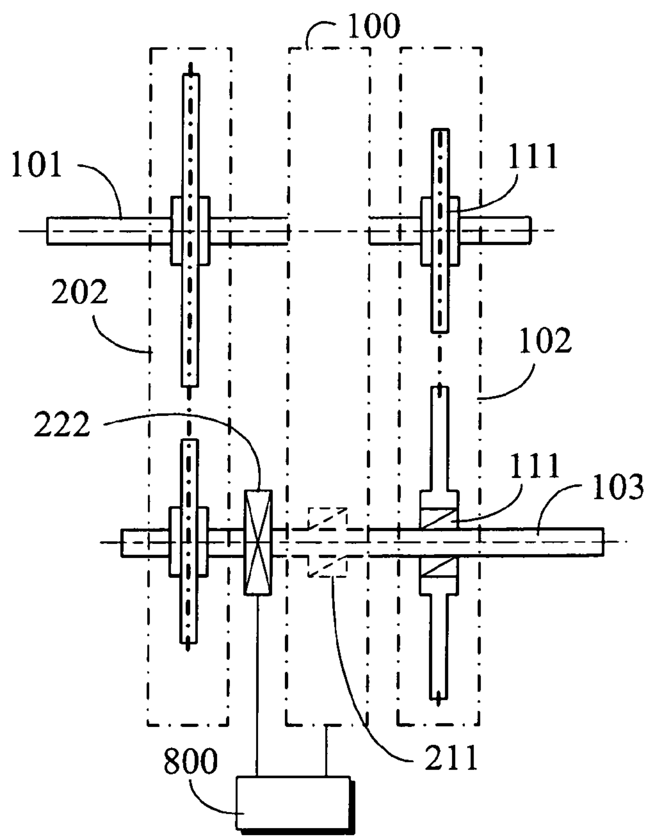
FIG. 12 is the twentieth embodiment schematic view of the invention constituted by the continuous variable transmission device of different shafts type as well as the high and low shift transmission pulley trains, wherein an unidiredtional transmission device is installed between the output shaft and the driving pulley of the low shift transmission pulley train; an unidirectional transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 13:
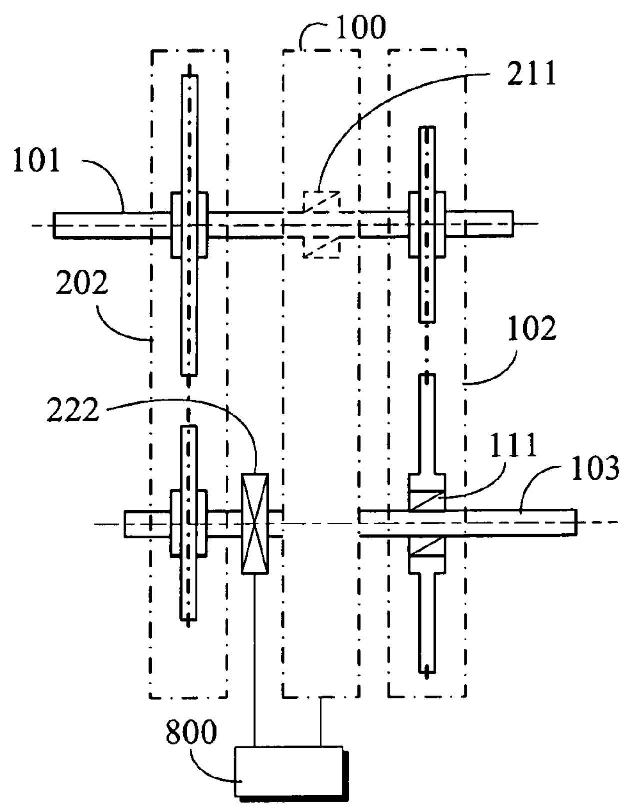
FIG. 13 is the thirteenth embodiment schematic view of the invention constituted by the continuous variable transmission device of different shafts type as well as the high and low shift transmission pulley trains, wherein an unidiredtional transmission device is installed between the output shaft and the driven pulley of the low shift transmission pulley train; an unidirectional transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.

An input shaft 101: It is the rotating shaft to receive a revolving kinetic energy input, whereby said revolving kinetic energy is transmitted to the driving pulley of the continuous variable transmission device of different shafts type 100 and to the driving pulley of the high shift transmission pulley train 202 for further transmission to the input end of the unidirectional transmission device 111 which is connected with a low shift transmission pulley train 102;

The high shift transmission pulley train 202: It comprises a driving pulley driven by the input shaft 101 and a driven pulley for driving the output shaft 103, wherein said driving pulley and driven pulley are transmitted in the same rotational directions, the transmission speed ratio thereof appears a high shift transmission function in accelerating transmission relative to the continuous variable transmission device of different shafts type 100, wherein the speed ratio relationship between the high shift transmission pulley train 202 and the continuous variable transmission device of different shafts type 100 is:

1. Speed ratio of the driving pulley to drive the driven pulley of the high shift transmission pulley train 202≧speed ratio of the continuous variable transmission device of different shafts type 100 in high speed output;

2. Speed ratio of the continuous variable transmission device of different shafts type 100 in high speed output>Speed ratio of the driving pulley to drive the driven pulley of the high shift transmission pulley train 202>speed ratio of the continuous variable transmission device of different shafts type 100 in low speed output;

The low shift transmission pulley train 102: It comprises a driving pulley which is driven by the input shaft 101 and a driven pulley for driving the output shaft 103, wherein said driving pulley and driven pulley are transmitted in the same rotational direction, the transmission speed ratio thereof appears a low shift transmission in decelerating transmission relative to the continuous variable transmission device of different shafts type 100, and the speed ratio relationship between the low shift transmission pulley train 102 and the continuous variable transmission device of different shafts type 100 is:

1. Speed ratio of the driving pulley to drive the driven pulley of the low shift transmission pulley train 102≦speed ratio of the continuous variable transmission device of different shafts type 100 in low speed output;

2. Speed ratio of the continuous variable transmission device of different shafts type 100 in low speed output<Speed ratio of the driving pulley to drive the driven pulley of the low shift transmission pulley train 102<speed ratio of the continuous variable transmission device of different shafts type 100 in high speed output;

An output shaft 103: it is the rotating shaft to supply revolving kinetic energy for driving the load, whereby the revolving kinetic energy is transmitted from the driven pulley of the continuous variable transmission device of different shafts type 100, or transmitted from the driven pulley of the low shift transmission pulley train 102, or the revolving kinetic energy from the driven pulley of the high shift transmission pulley train is transmitted through the clutching device 222 to drive the load;

An unidirectional transmission device 211: It is constituted by an unidirectional bearing, or an unidirectional clutch or a mechanism or device with unidirectional transmission function, etc. of radial or axial structures to be installed between the input shaft 103 and the driven pulley of the continuous variable transmission device of different shafts type 100 (as shown in FIGS. 2, 7, 12), or installed between the driving pulley of the continuous variable transmission device of different shafts type 100 and the input shaft 101 (as shown in FIGS. 3, 8, 13), wherein when the rotational speed of the driven pulley of the continuous variable transmission device of different shafts type 100 is higher than that of the output shaft 103 in the same revolving direction, the kinetic energy is transmitted through the driven pulley of the continuous variable transmission device of different shafts type 100 to drive the output shaft 103 for output. When the rotational speed of the output shaft 103 is raised to or over setting rotational speed, the clutching device 222 is closed to connect the driven pulley of the high shift transmission pulley train 202 and the output shaft 103, if the rotational speed of the output shaft 103 is higher than that of the driven pulley of the continuous variable transmission device of different shafts type 100, the unidirectional transmission device 211 is in no load operation. Further, if said unidirectional transmission device 211 is installed between the driving pulley of the continuous variable transmission device of different shafts type 100 and the input shaft 101 as shown in FIGS. 3, 8, 13, when the rotational speed of the output shaft 103 is raised to or over setting rotating speed, the clutching device 222 is closed to connect the driven pulley 202 of the high shift transmission pulley train 202 and the output shaft 103, if the rotational speed of the driving pulley of the continuous variable transmission device of different shafts type 100 is higher than that of the input shaft 101 in the same revolving direction, said unidirectional transmission device 211 is also in no load operation. Herein, said unidirectional transmission device 211 can be selected to be installed or not to be installed.

Figure 4:
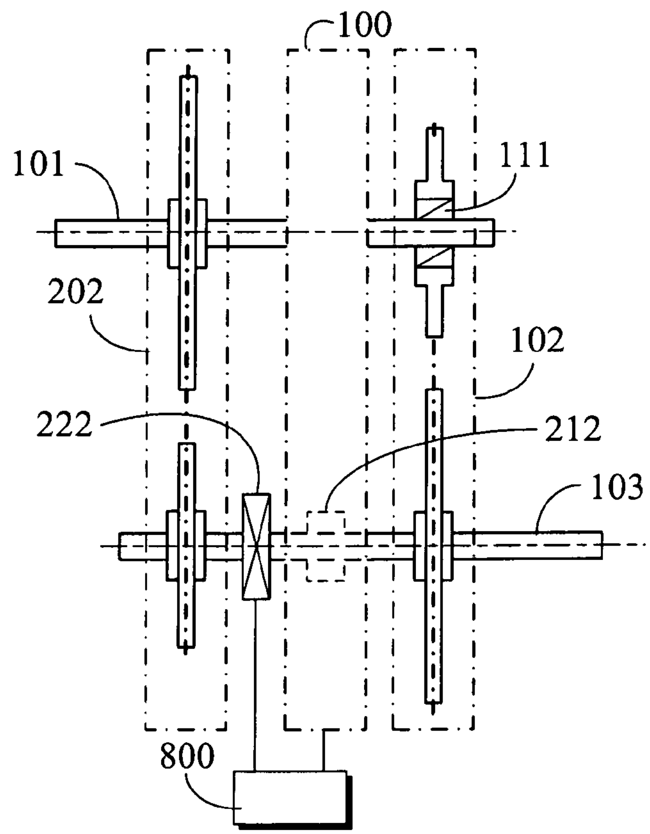
FIG. 4 is the fourth embodiment schematic view of the invention constituted by the continuous variable transmission device of different shafts type as well as the high and low shift transmission pulley trains, wherein an radial unidiredtional transmission device is installed between the input shaft and the driving pulley of the low shift transmission pulley train; an torque limiting transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 5:
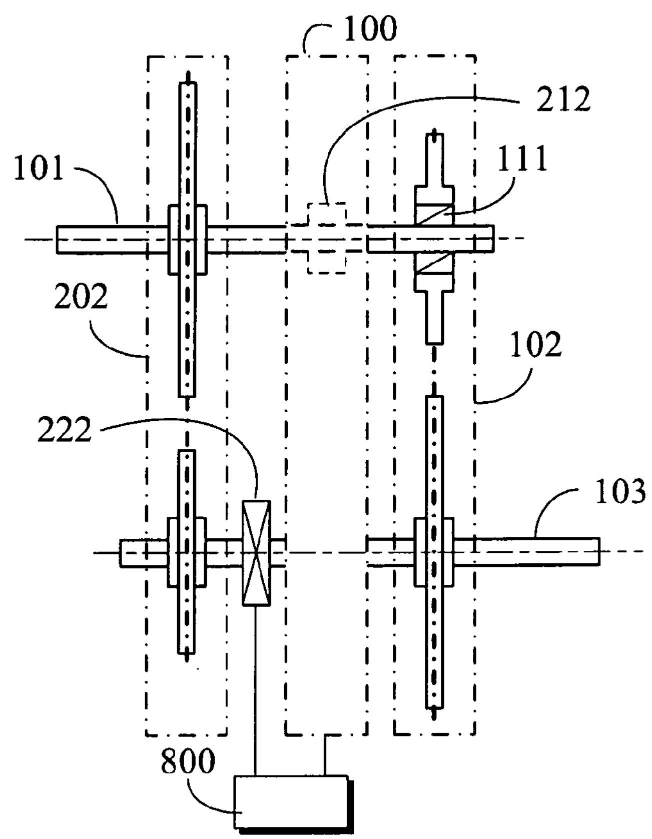
FIG. 5 is the fifth embodiment schematic view of the invention constituted by the continuous variable transmission device of different shafts type as well as the high and low shift transmission pulley trains, wherein an radial unidiredtional transmission device is installed between the input shaft and the driving pulley of the low shift transmission pulley train; a torque limiting transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 6:
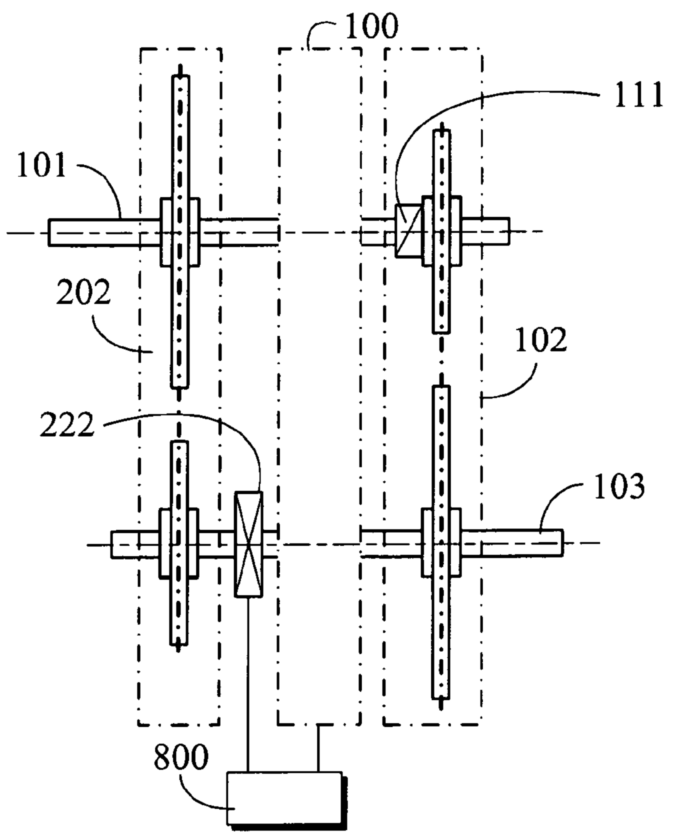
FIG. 6 is the sixth embodiment schematic view of the invention constituted by the continuous variable transmission device of different shafts type as well as the high and low shift transmission pulley trains, wherein an axial unidiredtional transmission device is installed between the input shaft and the driving pulley of the low shift transmission pulley train; and a clutching device is further installed between the driven pulley of the high shift transmission pulley train and the output shaft which is driven by the driven pulley of the continuous variable transmission device of different shafts type.
Figure 9:
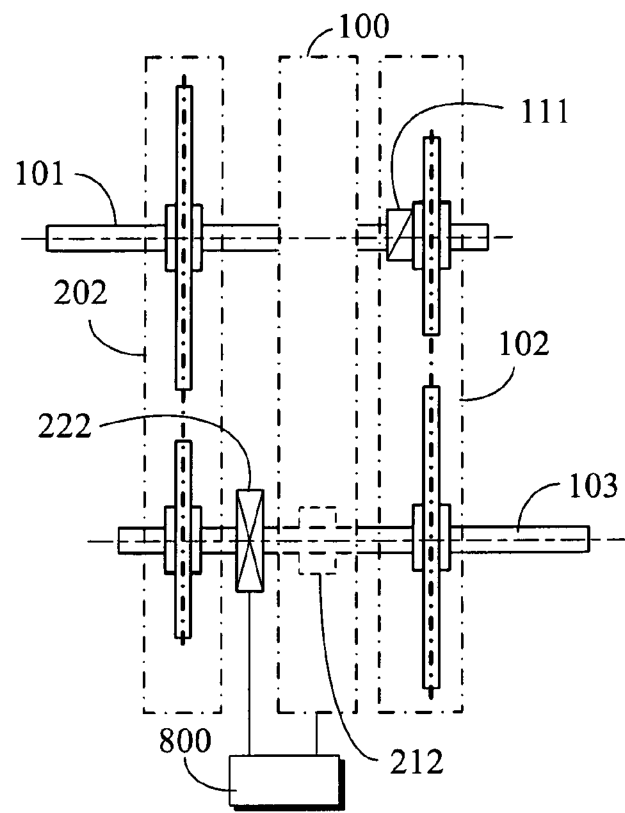
FIG. 9 is the ninth embodiment schematic view of the invention constituted by the continuous variable transmission device of different shafts type as well as the high and low shift transmission pulley trains, wherein an axial unidiredtional transmission device is installed between the input shaft and driving pulley of the low shift transmission pulley train; a torque limiting transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 10:
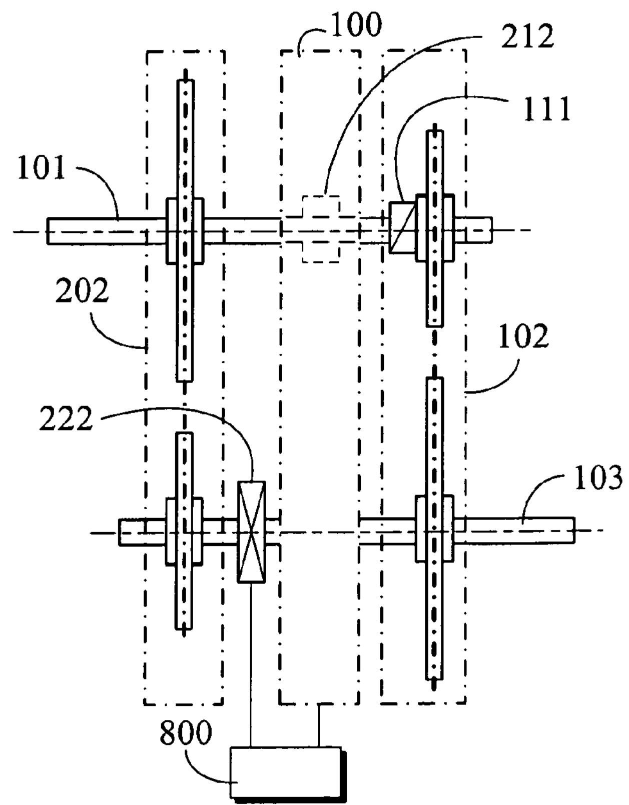
FIG. 10 is the tenth embodiment schematic view of the invention constituted by the continuous variable transmission device of different shafts type as well as the high and low shift transmission pulley trains, wherein an axial unidiredtional transmission device is installed between the input shaft and the driving pulley of the low shift transmission pulley train; an torque limiting transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 11:
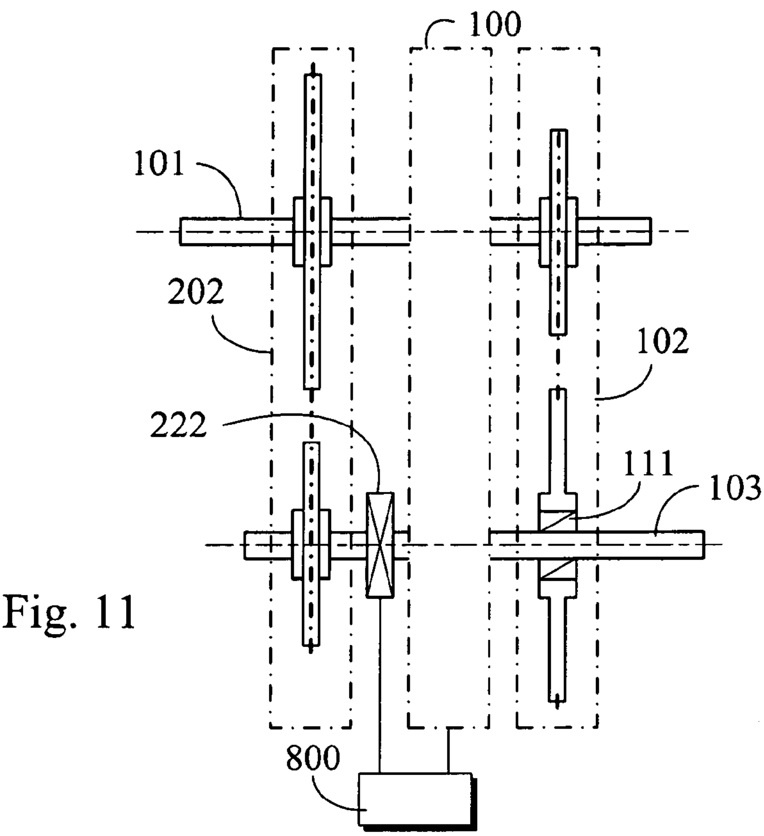
FIG. 11 is the eleventh embodiment schematic view of the invention constituted by the continuous variable transmission device of different shafts type as well as the high and low shift transmission pulley trains, wherein an unidiredtional transmission device is installed between the output shaft and the driven pulley of the low shift transmission pulley train; and a clutching device is further installed between the driven pulley of the high shift transmission pulley train and the output shaft which is driven by the driven pulley of the continuous variable transmission device of different shafts type.
Figure 14:
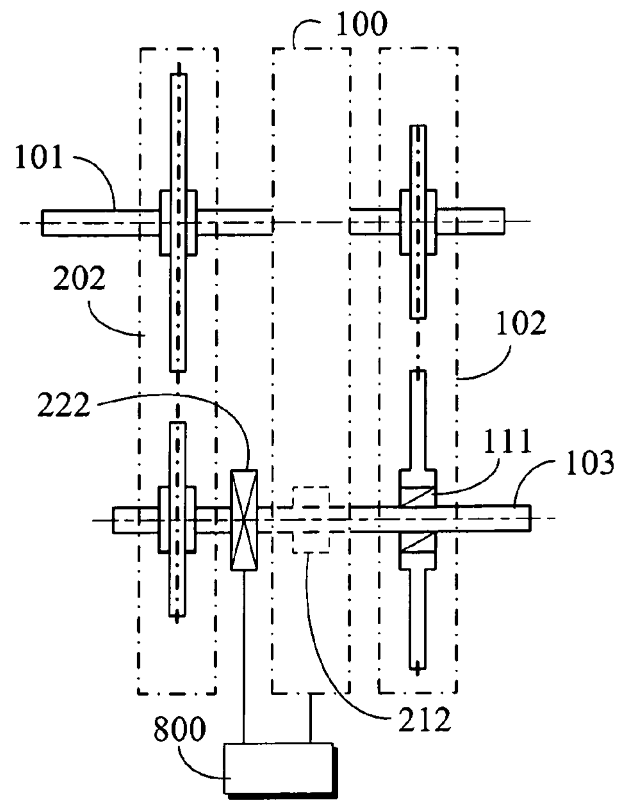
FIG. 14 is the fourteenth embodiment schematic view of the invention constituted by the continuous variable transmission device of different shafts type as well as the high and low shift transmission pulley trains, wherein an unidiredtional transmission device is installed between the input shaft and the driven pulley of the low shift transmission pulley train; an torque limiting transmission device is installed between the output shaft and the driven pulley of the continuous variable transmission device of different shafts type; and a clutching device is further installed between the driven pulley of the high shift transmission pulley train and the output shaft which is driven by the driven pulley of the continuous variable transmission device of different shafts type.
Figure 15:
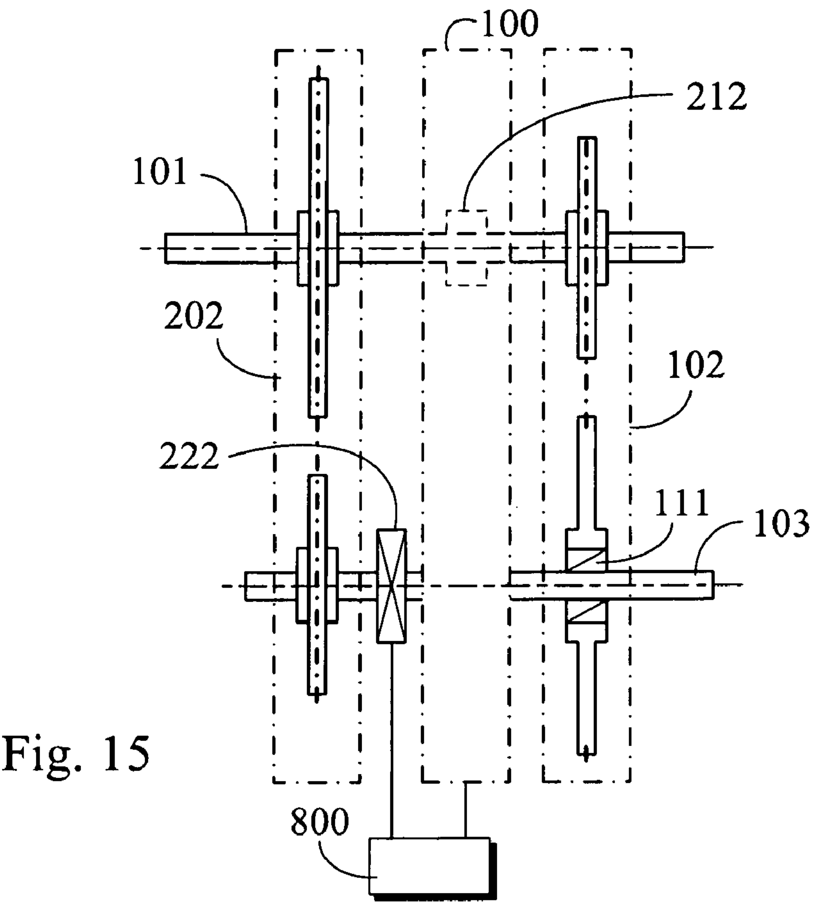
FIG. 15 is the fifteenth embodiment schematic view of the invention constituted by the continuous variable transmission device of different shafts type as well as the high and low shift transmission pulley trains, wherein an unidiredtional transmission device is installed between the input shaft and the driven pulley of the low shift transmission pulley train; an torque limiting transmission device is installed between the input shaft and the driving pulley of the continuous variable transmission device of different shafts type; and a clutching device is further installed between the driven pulley of the high shift transmission pulley train and the output shaft which is driven by the driven pulley of the continuous variable transmission device of different shafts type.

A torque limiting clutching device 212: It is constituted by a sliding type or clutching type torque limiting device in radial or axial direction for replacing unidirectional transmission device 211 to be installed between the driven pulley of the continuous variable transmission device of different shafts type 100 and the output shaft 103 (as shown in FIGS. 4, 9, 14), or to be installed between the driving pulley of the continuous variable transmission device of different shafts type 100 and the input shaft 101 (as in FIGS. 5, 10, 15), whereby when the rotational speed of the output shaft 103 is raised to or over setting speed, the clutching device 222 is closed, and when there is a rotational speed difference causing torque difference to exceed its setting value between the output shaft 103 and the driven pulley of the continuous variable transmission device of different shafts type 100, or between the input shaft 101 and the driving pulley of the continuous variable transmission device of different shafts type 100, said torque limiting clutching device 212 is slid or released; wherein said torque limiting clutching device 212 can be selected to be installed or not to be installed.

The unidirectional transmission device 111: it is parallel connected with low shift transmission pulley train 102 and is constituted by a radial type unidirectional transmission device as indicated by applications shown in FIGS. 1~5; or it can be constituted by an axial type unidirectional transmission device as indicated by applications shown in FIGS. 6~10; including the constitution by an unidirectional bearing with unidirectional transmission function, and an unidirectional clutch or an unidirectional transmission mechanism or device, wherein said unidirectional transmission device 111 can be optionally installed as needed between the input shaft 101 and the driving pulley of the low shift transmission pulley train 102, or installed as needed between the driven pulley of the low shift transmission pulley train 102 and the output shaft 103 as shown in FIGS. 11~15;

The clutching device 222: It is optionally selected as needed to be constituted by 1) passively operated centrifugal type clutches by centrifugal force or torque operated type passive clutches, or 2) clutches actively operated by manual or mechanical power, or driven by electromagnetic or hydraulic or pneumatic pressure to be actively randomly controlled manually or controlled by a built-in or externally installed rotational speed detector device or torque detector device, whereby the detected signals of the rotational speed or the rotating torque are processed by the driving control device 800 to actively control the clutching device 222 for releasing or closing operations. The clutching device 222 is for installing between the driven pulley of the high shift transmission pulley train 202 and the output shaft 103, wherein it can be an independent structure, or to integrate with a high shift transmission pulley train, or to integrate with a continuous variable transmission device of different shafts type 100, or a high shift transmission pulley train 202, a continuous variable transmission device of different shafts type 100 and a clutching device 222 can be integrated, thereby to close for kinetic energy transmission or to release for cutting off kinetic energy transmission.

A driving control device 800: It is installed according to characteristics of selected continuous variable transmission device of different shafts type 100 and clutching device 222. Said driving control device is provided with a driving power source including electric power supply unit, hydraulic oil pressure supply unit, or pneumatic pressure supply unit as well as relevant electric power control unit, hydraulic oil pressure control unit, or pneumatic pressure control unit to control the speed ratio of the continuous variable transmission device of different shafts type 100 or the closing or releasing operating function of the clutching device 222;

If the continuous variable transmission device of different shafts type 100 is selectively passively operated by torque following transmission speed ratio modulating structure or by rotating speed following speed ratio modulating structure, or a centrifugal type clutching device or a torque operated type passive clutching device 222 is also further used for passive controlled operation, said driving control device 800 can be not be installed;

If an active controlled type clutching device is selected for the clutching device 222, or an actively operated continuous variable transmission device requiring an external power driving source for speed ratio modulation is selected for continuous variable transmission device of different shafts type 100, then a driving control device 800 shall be installed to actively control the speed ratio of the continuous variable transmission device of different shafts type 100 which requires an external power driving source for speed ratio modulation, or to control the active operating type clutching device 222 for closing or releasing functions whereof.

The continuous variable transmission device with high and low shift transmission pulley trains comprising above said main structures, wherein its constitution and operating functions include the following:

1. The input shaft 101 of the continuous variable transmission device of different shafts type 100 is additionally installed with a driving pulley of the high shift transmission pulley train 202, and a clutching device 222 is installed between a driven pulley of the high shift transmission pulley train 202 and an output shaft 103 which is driven by the driven pulley of the continuous variable transmission device of different shafts type 100; and 2. An unidirectional transmission device 211 is optionally installed as needed between the output shaft 103 and the driven pulley of the continuous variable transmission device of different shafts type 100, or between the driving pulley of the continuous variable transmission device of different shafts type 100 and the input shaft 101, wherein the transmission direction of said unidirectional transmission device 211 shall allow that when the output shaft 103 is rotated higher than that of the driven pulley of the continuous variable transmission device of different shafts type 100 in the same revolving directions, or the rotational speed of the driving pulley of the continuous variable transmission device of different shafts type 100 is higher than that of the input shaft 101 in the same revolving direction, said unidirectional transmission device 211 is at no load operation, while the revolving kinetic energy is transmitted by the driven pulley of the high shift transmission pulley train 202 via the clutching device 222 to drive the output shaft 103 and further to drive the load; or 3. A torque limiting clutching device 212 is optionally installed as needed between the output shaft 103 and the driven pulley of the continuous variable transmission device of different shafts type 100, or between the driving pulley of the continuous variable transmission device of different shafts type 100 and the input shaft 101, whereby when the output shaft 103 is rotated faster than the driven pulley of the continuous variable transmission device of different shafts type 100 in the same revolving directions, or when the rotational speed of the driving pulley of the continuous variable transmission device of different shafts type 100 is higher than that of the input shaft 101 in the same revolving directions, said torque limiting clutching device 212 is slid or released, while the revolving kinetic energy is transmitted by the driven pulley of the high shift transmission pulley train 202 via the clutching device 222 to drive the output shaft 103 and further to drive the load;

4. The transmission direction of said unidirectional transmission device 111 in connection with the low shift transmission pulley train 102 shall allow that when the input shaft 101 is rotated faster than the driving pulley of the low shift transmission pulley train 102 in the same revolving directions, the revolving kinetic energy is transmitted to the driving pulley of the low shift transmission pulley train 102; contrarily when the rotational speed of the input shaft 101 is lower than that of the driving pulley of the low shift transmission pulley train 102 in the same revolving directions, said unidirectional transmission device 111 is at no load operation; or when the rotational speed of the driven pulley of the low shift transmission pulley train 102 is higher than that of the output shaft 103, said input shaft 101 is driven to rotate, or contrarily when the rotational speed of the output shaft 103 is lower than the driven pulley of the low shift transmission pulley train 102 in the same revolving directions, said unidirectional transmission device 111 is at no load operation.

Operating functions of said continuous variable transmission device with high and low shift transmission pulley trains include:

1. For said continuous variable transmission device of different shafts type 100, if a deceleration type continuous variable transmission device is used to operate at minimum decelerating speed ratio or near minimum decelerating speed ratio status, or an acceleration type continuous variable transmission device is used to operate at maximum accelerating speed ratio or near maximum accelerating speed ratio, then when the output shaft 103 is rotated to or over setting rotational speed, the clutching device 222 is closed to connect the driven pulley of the high shift transmission pulley train 202 and the output shaft 103, whereby the rotational speed of the output shaft 103 is driven by the driving pulley of the high shift transmission pulley train 202 via the clutching device 222 to appear higher than or equal to that of the driven pulley of the continuous variable transmission device of different shafts type 100 to further drive the load;

At said status, it is characterized in that the power is transmitted by the continuous variable transmission device of different shafts type 100, via the high shift transmission pulley 202 and the clutching device 222 to drive the output shaft 103 and further to drive the load;

2. When the output shaft 103 is rotated to below setting rotational speed, said clutching device 222 is released, then the revolving kinetic energy from the input shaft 101 is through the continuous variable transmission device of different shafts type 100 to drive the output shaft 103 and further to drive the load;

3. During low speed and high load operation, said clutching device 222 is released, wherein for said continuous variable transmission device of different shafts type 100, if a deceleration type continuous variable transmission device is used to operate at maximum decelerating speed ratio or near maximum decelerating speed ratio status, or an acceleration type continuous variable transmission device is used to operate at minimum accelerating speed ratio or near minimum accelerating speed ratio status, whereby when the rotational speed of the driving pulley of the low shift transmission pulley train 102 is lower than that of the input shaft 101 in the same revolving directions, the revolving kinetic energy from the input shaft 101 is through the unidirectional transmission device 111 and the low shift transmission pulley train 102 to drive the output shaft 103 and further to drive the load, at said status, the power originally transmitted by the continuous variable transmission device of different shafts type 100 is changed to be transmitted by the low shift transmission pulley train 102 to drive the output shaft 103, while during lower load operation, the kinetic energy is transmitted by the continuous variable transmission device of different shafts type 100;

4. If an unidirectional transmission device 111 is installed between the driven pulley of the low shift transmission pulley train 102 and the output shaft 103, during higher load operation, if a deceleration type continuous variable transmission device is used to operate at maximum decelerating speed ratio or near maximum decelerating speed ratio status, or an acceleration type continuous variable transmission device is used to operate at minimum accelerating speed ratio or near minimum accelerating speed ratio status, whereby when the rotational speed of the driven pulley of the low shift transmission pulley train 102 is changed to higher than that of the output shaft 103 in the same revolving directions, the revolving kinetic energy is transmitted through the low shift transmission train 102 and the unidirectional transmission device 111 to drive the output shaft 103 and further to drive the load, at said status, the power originally transmitted by the continuous variable transmission device of different shafts type 100 is changed to be transmitted by the low shift transmission pulley train 102 to drive the output shaft 103, while during lower load operation, the kinetic energy is transmitted through the continuous variable transmission device of different shafts type 100 to drive the output shaft 103;

Said continuous variable transmission device with high and low shift transmission pulley trains as described in FIGS. 1~15, wherein in practical applications, the unidirectional transmission devices 111 or 211, the torque limiting clutching devices 212 can be optionally mixed for use. Locations to install the unidirectional transmission device 111 or 211 or locations to install the torque limiting clutching devices 212 can be 1) All locations selectively installed with the unidirectional transmission device 111 or 211 or 2) All locations selectively installed with the torque limiting clutching device 212, or 3) Partial locations selectively installed with the unidirectional transmission device 111 or 211 while other partial locations selectively installed with the torque limiting clutching device 212.

Figure 16:
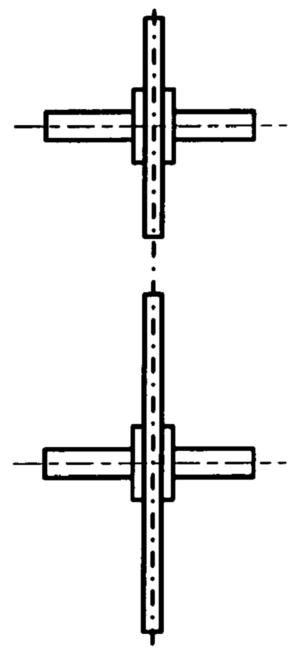
FIG. 16 is a structural schematic view showing that the high shift transmission pulley train or the low shift transmission pulley train of the invention is constituted by a driving chain pulley, a driven chain pulley and a transmission chain.
Figure 17:
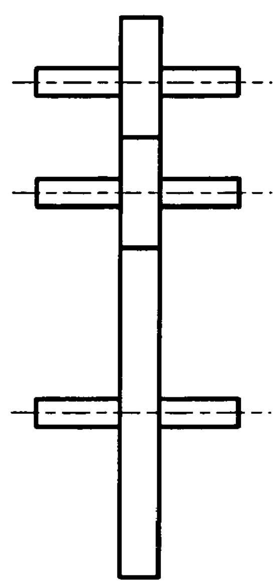
FIG. 17 is a structural schematic view showing that the high shift transmission pulley train or the low shift transmission pulley train is constituted by a driving pulley, a middle driven pulley and a pulley.
Figure 18:
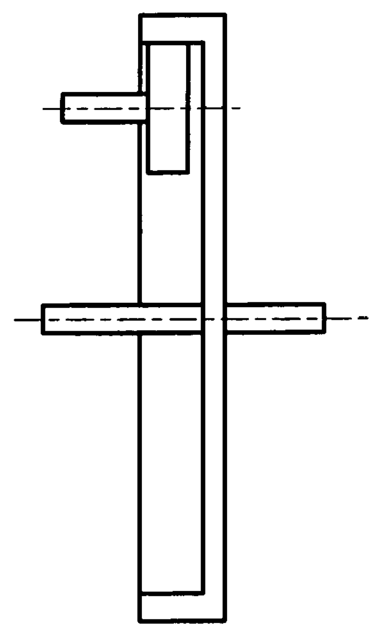
FIG. 18 is a structural schematic view showing that the high shift transmission pulley train or the low shift transmission pulley train is constituted by a smaller outer diameter transmission pulley and a larger outer diameter inner transmission pulley.
Figure 19:
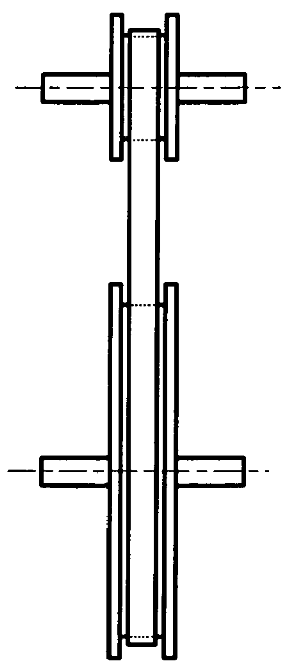
FIG. 19 is a structural schematic view showing that the high shift transmission pulley train or the low shift transmission pulley train is constituted by a driving belt pulley, a driven belt pulley and a transmission belt.

Said high shift transmission pulley train 202 and said low shift transmission pulley train 102 of the continuous variable transmission device with high and low shift transmission pulley trains can be optionally constituted as needed by the following:

1. It is constituted by a driving chain pulley, a driven chain pulley, and an attached transmission chain, wherein FIG. 16 is a structural schematic view showing that the high shift transmission pulley train 202 or the low shift transmission pulley train 102 of the invention is constituted by a driving chain pulley, a driven chain pulley and an attached transmission chain; or 2. It is constituted by a driving pulley, a middle driven pulley and a driven pulley, wherein said driving pulley, middle driven pulley and driven pulley include constitutions by gears or friction pulleys. FIG. 17 is a structural schematic view showing that the high shift transmission pulley train 202 or the low shift transmission pulley train 102 is constituted by a driving pulley, a middle driven pulley and a driven pulley; or 3. It is constituted by an inner gear train or an inner friction pulley train comprising a smaller outer diameter transmission pulley and a larger outer diameter inner transmission pulley. FIG. 18 is a structural schematic view showing that the high shift transmission pulley train 202 or the low shift transmission pulley train 102 is constituted by a smaller outer diameter transmission pulley and a larger outer diameter inner transmission pulley; or 4. It is constituted by a driving belt pulley, a driven belt pulley and an attached transmission belt such as a canvas belt, a steel belt, or a chain belt. FIG. 19 is a structural schematic view showing that the high shift transmission pulley train 202 or the low shift transmission pulley train 102 is constituted by a driving belt pulley, a driven belt pulley and a transmission belt.

Figure 20:
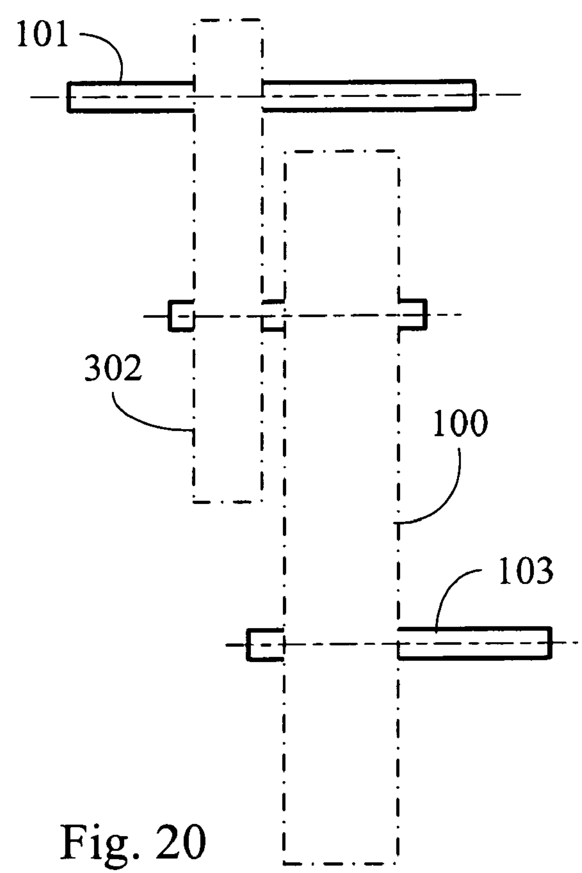
FIG. 20 is a structural schematic view of the invention showing that a speed change pulley train is installed between the input shaft and the driving pulley of the continuous variable transmission device of different shafts type.
Figure 21:
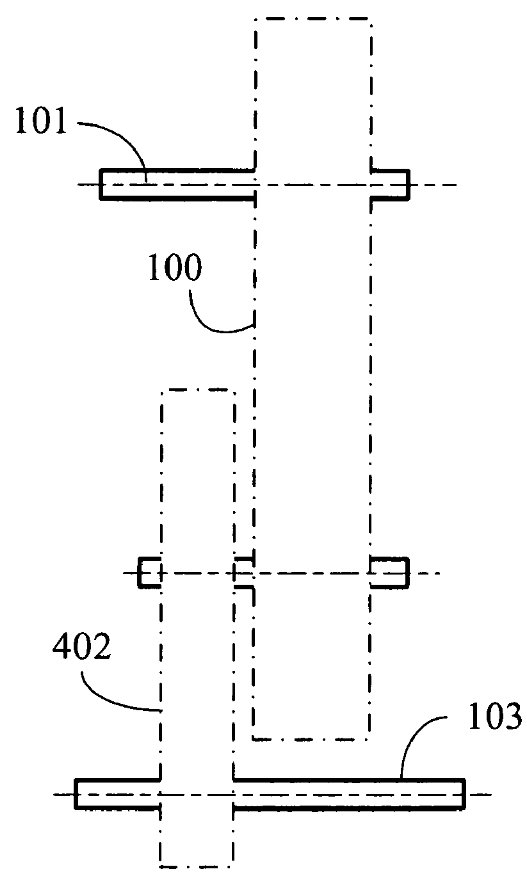
FIG. 21 is a structural schematic view of the invention showing that a speed change pulley train is installed between the output shaft and the driven pulley of the continuous variable transmission device of different shafts type.
Figure 22:
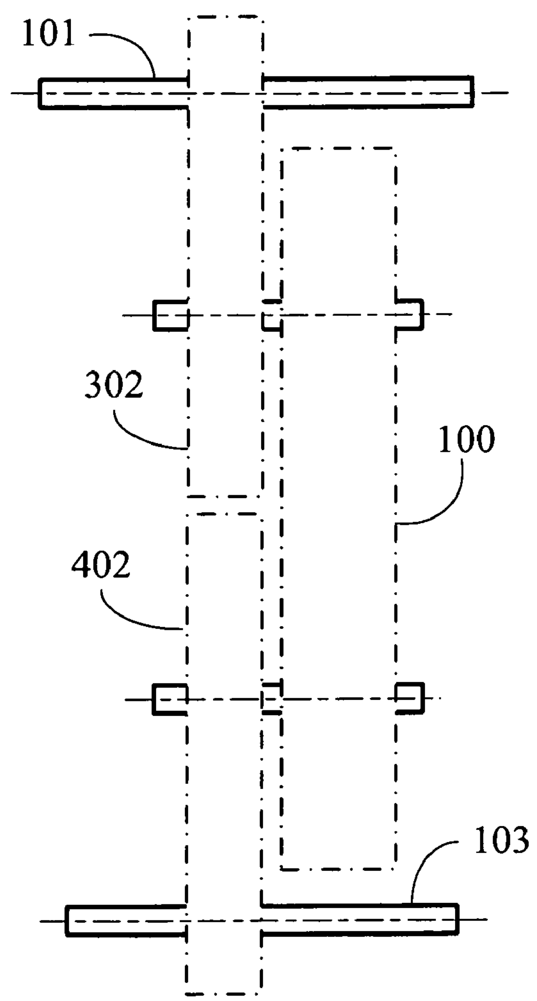
FIG. 22 is a structural schematic view of the invention showing that speed change pulley trains are installed between the input shaft and the driving pulley of the continuous variable transmission device of different shafts type and between the output shaft and the driven pulley of the continuous variable transmission device of different shafts type.

For sake of efficiency, when diameters of the driving pulley and the driven pulley are made more similar to each other to ensure a better efficiency in the continuous variable transmission of different shafts type 100 of said continuous variable transmission device with high and low shift transmission pulley trains, a middle transmission pulley for accelerating speed ratio or decelerating speed ratio can be installed to satisfy the needs for accelerating speed ratio or decelerating speed ratio in order to ensure a better transmission efficiency, wherein said middle transmission pulley includes:

1. A speed change pulley train 302 is further installed between the input shaft 101 and the driving pulley of the continuous variable transmission device of different shafts type 100 to change the total speed ratio of the input shaft 101 and the output shaft 103 and is matched to required revolving direction. FIG. 20 is a structural schematic view of the invention showing that a speed change pulley train is installed between the input shaft 101 and the driving pulley of the continuous variable transmission device of different shafts type 100; or 2. A speed change pulley train 402 is further installed between the output shaft 103 and the driven pulley of the continuous variable transmission device of different shafts type 100 to change the total speed ratio of the input shaft 101 and the output shaft 103 and is matched to required revolving direction. FIG. 21 is a structural schematic view of the invention showing that a speed change pulley train is installed between the output shaft 103 and the driven pulley of the continuous variable transmission device of different shafts type 100; or 3. The speed change pulley trains 302, 402 are simultaneously installed between the input shaft 101 and the driving pulley of the continuous variable transmission device of different shafts type 100 and between the output shaft 103 and the driven pulley of the continuous variable transmission device of different shafts type 100 to change the total speed ratio of the input shaft 101 through continuous variable transmission device of different shafts type 100 to drive the output shaft 103 and are matched to required revolving direction. FIG. 22 is a structural schematic view of the invention showing that speed change pulley trains are installed between the input shaft 101 and the driving pulley of the continuous variable transmission device of different shafts type 100 and between the output shaft 103 and the driven pulley of the continuous variable transmission device of different shafts type 100;

The low shift transmission pulley train of said continuous variable transmission device with high and low shift transmission pulley trains can be selected according to application requirements to include the following:

1. To be constituted by a single stage low shift transmission pulley train of fixed speed ratio;

2. To be constituted by a multi-stage type variable speed ratio low shift variable transmission pulley train of manual shift or automatic transmission.

For said continuous variable transmission device with high and low shift transmission pulley trains, input methods for supplying revolving kinetic energy to the input shaft 101 can be selected based on application requirements to include the following:

1. The input shaft 101 is for receiving direct revolving power source input from revolving power source such as engine, motor or generator or input from flywheel, wind power fan blades, gas or liquid turbines, or manual power, etc.

2. The revolving power sources as said in item 1 supplied to the input shaft 101 for output is first controlled by a clutching device before providing revolving kinetic energy output;

3. The revolving power sources as said in item 1 supplied to the input shaft 101 for output is further through a fixed speed change transmission device, a stepped or stepless speed change transmission device in manual shift or automatic transmission, or a fluid transmission device, or an electromagnetic eddy current transmission device to provide revolving kinetic energy output;

4. The revolving power sources as said in item 1 supplied to the input shaft 101 for output is further through a clutching device and a fixed speed change transmission device, a stepped or stepless speed change transmission device of manual shift or automatic transmission, or a fluid transmission device, or an electromagnetic eddy current transmission device to provide revolving kinetic energy output.

The revolving kinetic energy output of the output shaft 103 of said continuous variable transmission high and low shift transmission pulley trains can be selected according to application requirements to include the following:

1. The revolving kinetic energy output from the output shaft 103 is directly used to drive the load;

2. The revolving kinetic energy output from the output shaft 103 is through a clutching device to further drive the load;

3. The revolving kinetic energy from the output shaft 103 is through a speed change transmission device with fixed speed ratio, or a stepless or stepped speed change transmission device of manual shift or automatic transmission, or a fluid transmission device, or electromagnetic eddy current transmission device to further drive the load;

4. The revolving kinetic energy output from the output shaft 103 is through a clutching device and a stepless or stepped speed change device with fixed speed ratio or of manual shift or automatic transmission, or a fluid transmission device, or an electromagnetic eddy current transmission device to further drive the load.

The high shift transmission pulley train of said continuous variable transmission device with high and low shift transmission pulley trains can be selected according to application requirements to include the following:

1. To be constituted by a single stage high shift transmission pulley train of fixed speed ratio;

2. To be constituted by a multi-stage type variable speed ratio high shift variable transmission pulley train of manual shift or automatic transmission.

For said continuous variable transmission device with high and low shift transmission pulley trains, input methods for supplying revolving kinetic energy to the input shaft 101 can be selected based on application requirements to include the following:

1. The input shaft 101 is for receiving direct revolving power source input from revolving power source such as engine, motor or generator or input from flywheel, wind power fan blades, gas or liquid turbines, or manual power, etc.;

2. The revolving power sources as said in item 1 supplied to the input shaft 101 for output is first controlled by a clutching device before providing revolving kinetic energy output;

3. The revolving power sources as said in item 1 supplied to the input shaft 101 for output is further through a speed change transmission device with fixed speed ratio, a stepped or stepless speed change transmission device of manual shift or automatic transmission, or a fluid transmission device, or an electromagnetic eddy current transmission device to provide revolving kinetic energy output;

4. The revolving power sources as said in item 1 supplied to the input shaft 101 for output is further through a clutching device and a speed change transmission device with fixed speed ratio, a stepped or stepless speed change transmission device of manual shift or automatic transmission, or a fluid transmission device, or an electromagnetic eddy current transmission device to provide revolving kinetic energy output.

The revolving kinetic energy output of the output shaft 103 of said continuous variable transmission device with high and low shift transmission pulley trains can be selected according to application requirements to include the following:

1. The revolving kinetic energy output from the output shaft 103 is directly used to drive the load;

2. The revolving kinetic energy output from the output shaft 103 is through a clutching device to further drive the load;

3. The revolving kinetic energy from the output shaft 103 is through a speed change transmission device with fixed speed ratio, or a stepless or stepped speed change transmission device of manual shift or automatic transmission, or a fluid transmission device, or electromagnetic eddy current transmission device to further drive the load;

4. The revolving kinetic energy output from the output shaft 103 is through a clutching device and a stepless or stepped speed change device with fixed speed ratio or of manual shift or automatic transmission, or a fluid transmission device, or an electromagnetic eddy current transmission device to further drive the load.

In the continuous variable transmission device with high and low shift transmission pulley trains, the practical applied structures of said continuous variable transmission device of different shafts type 100 and said low shift transmission pulley train 102 and said high shift transmission pulley train 202 can be selectively made to be independently separated mechanical devices and combined afterwards for transmission or made to an integral structure or made to a structure of a common integrated mechanical device and a common integrated casing.

As summarized from above descriptions, said continuous variable transmission device with high and low shift transmission pulley trains is characterized in that said continuous variable transmission device of different shafts type 100 is installed with a high shift transmission pulley train 202 to control the clutching device 222 to close when the output shaft 103 is in high speed rotation, whereby the transmission function is carried out by said high shift transmission pulley train 202 to drive the load via the output shaft 103, while a low shift transmission pulley train 102 is further installed so that in low speed loading, the load is driven by said low shift transmission pulley train 102 in order to elongate the service life of said continuous variable transmission device with high and low shift transmission pulley trains and to promote the transmission efficiency.

The invention claimed is:

1. A continuously variable transmission with supplemental high and low shift transmission pulley trains, comprising:

a continuously variable different-shaft-type transmission device (100) having a CVT driving pulley and a CVT driven pulley, said CVT driving pulley and CVT driven pulley having a continuously variable speed ratio;

a high shift transmission pulley train (202) connected to an input side of the continuously variable different-shaft-type transmission device (100), said high shift transmission pulley train (202) including a high shift driving pulley and a high shift driven pulley, said high shift driving pulley being directly connected to an input shaft (101) and connected to an output shaft (103) through a clutching device (222), wherein said high shift driving pulley and high shift driven pulley rotate in a same direction and have a fixed or multi-stage variable speed ratio; and a low shift transmission pulley train (102) connected to a unidirectional transmission device (111) and including a low shift driving pulley driven by an input shaft (101) and a low shift driven pulley connected to said output shaft, wherein said low shift driving pulley and said low shift driven pulley rotate in a same direction and have a fixed or multi-stage variable speed ratio, and wherein said unidirectional input device (111) is installed in one of the following two positions:

(a) between the input shaft (101) and the low shift driving pulley;

(b) between the low shift driving pulley and the output shaft (103), for engaging and disengaging said low shift driving pulley from either said input shaft (101) or said output shaft (103), said engagement and disengagement depending on a speed of said low shift driving pulley relative to said input shaft or output shaft, wherein said clutching device (222) is connected between said high shift driven pulley and said output shaft (103) for selectively connecting and disconnecting said high shift driven pulley and said CVT driven pulley; and further comprising one of the following two devices for engaging said continuously variable transmission device with either said input shaft (101) or said output shaft (103):

(a) a second unidirectional transmission device (211) on an output side of the continuously variable transmission device, and (b) a torque limiting clutching device (212) installed between the high shift driven pulley and the output shaft on which the low shift driven pulley is installed.

2. A continuously variable transmission as claimed in claim 1, wherein a relationship between the speed ratio of the high shift driving and driven pulleys and the continuously variable speed ratio is either:

(a) said speed ratio of the high shift driving pulley to the high shift driven pulley≧said continuously variable speed ratio in high speed output; or (b) said continuously variable speed ratio in high speed output>said speed ratio of the high shift driving pulley to the high shift driven pulley>said continuously variable speed ratio in low speed output.

3. A continuously variable transmission as claimed in claim 1, wherein a relationship between the speed ratio of the low shift diving and driven pulleys and the continuously variable speed ratio is either:

(a) said speed ratio of the low shift driving pulley to the low shift driven pulley is ≦said continuously variable speed ratio in low speed output, or (b) said continuously variable speed ratio in low speed output is <said speed ratio of the low shift driving pulley to the low shift driven pulley<said continuously variable speed ratio in high speed output.

4. A continuously variable transmission as claimed in claim 1, wherein:

when a rotational speed of the output shaft (103) is higher than a speed of said CVT driven pulley or when a rotational speed of said CVT driving pulley is higher than a rotational speed of said input shaft (101), said torque limiting clutching device (212) is released and said clutching device (222) is closed to supply kinetic energy from said high shift driven pulley to said output shaft (103) to drive said output shaft (103) by the high shift gear train, when a rotational speed of the CVT driven pulley is greater than a rotational speed of the output shaft (103) and a rotational speed of the output shaft (103) is higher than a preset speed, the kinetic energy is transmitted through the CVT driven pulley to drive the output shaft (103) by continuously variable transmission, when a rotational speed of the CVT driving pulley is higher than a rotational speed of the input shaft (101) in the same rotating direction, or when a rotational speed of the CVT driven pulley is higher than a rotational speed of the output shaft (103), then said unidirectional transmission device (211) is in no load operation, when a rotational speed of the input shaft (101) is faster than that of the low shift driving pulley in the same direction or when the rotational speed of the driven pulley is higher than the rotational speed of the output shaft (103) in the same direction, said unidirectional transmission device (111) engages to drive said output shaft (103) via said low shift pulley train (102), and when the rotational speed of the input shaft (101) is lower than a rotational speed of the low shift driving pulley or the rotational speed of the low shift driven pulley is higher than the rotational speed of the output shaft (103), said unidirectional transmission device (111) is in no load operation.

5. A continuously variable transmission as claimed in claim 1, wherein when a rotational speed of the low shift driven pulley is higher than a rotational speed of the output shaft (103) in the same direction, said continuously variable transmission device drives said output shaft (103) when a load is lower is lower than a preset value, and said low shift pulley train (102) drives said output shaft when a load is higher than a preset value.

6. A continuously variable transmission as claimed in claim 1, wherein when a torque differential between the output shaft (103) and the CVT driven pulley, or between the input shaft (101) and the CVT driving pulley exceeds a preset value, said torque limiting clutching device (212) is closed to supply kinetic energy from said CVT driven pulley to said output shaft (103), and wherein when a rotational speed of the output shaft is lower than a preset speed and a torque differential between the input shaft (101) and the output shaft (103), said unidirectional transmission (111) engages to transmit kinetic energy from said input shaft (101) through said low shift gear train (102) to said output shaft (103).

7. A continuously variable transmission as claimed in claim 1, wherein said clutching device (222) is released during low speed and high load operation, and further wherein:

said unidirectional transmission device is installed between the input shaft (101) and the low shift driving pulley, such that when said continuously variable transmission device (100) operates at a maximum deceleration speed ratio, or at a minimum acceleration speed ratio, and when the rotational speed of the low shift driving pulley is lower than a rotational speed of the input shaft (101) in the same revolving direction, the unidirectional transmission (111) engages to transmit kinetic energy from the input shaft (101) to the output shaft (103), or said unidirectional transmission device is installed between the low shift driven pulley and the output shaft (103), such that when said continuously variable transmission device (100) operates at a maximum deceleration speed ratio, or at a minimum acceleration speed ratio, and when the rotational speed of the low shift driven pulley is higher than a rotational speed of the input shaft (101) in the same revolving direction, the unidirectional transmission (111) engages to transmit kinetic energy from the input shaft (101) to the output shaft (103).

8. A continuously variable transmission as claimed in claim 1, wherein said continuously variable transmission device is one of the following types of continuously variable transmission: rubber belt, metal belt, chain, electronic (ECVT), or friction disc type of continuously variable transmission device.

9. A continuously variable transmission as claimed in claim 8, wherein the speed ratio of the continuously variable transmission device is automatically passively modulated by following torque or rotational speed.

10. A continuously variable transmission as claimed in claim 1, wherein said clutching device (222) is a centrifugal clutching device or a torque operated passive clutching device for passively modulating said continuously variable transmission device.

11. A continuously variable transmission as claimed in claim 1, wherein the speed ratio of the continuously variable transmission device is actively modulated by applying a linear driving force generated by an external linear driving device or a revolving driving device via a mechanical transmission device to change a spacing between V-belt grooves of either or both of the CVT driving pulley or the CVT driven pulley.

12. A continuously variable transmission as claimed in claim 11, wherein the active modulation is controlled by a driving control device (800).

13. A continuously variable transmission as claimed in claim 12, wherein the driving control device (800) controls clutching device (222).

14. A continuously variable transmission as claimed in claim 1, wherein the unidirectional transmission device (111) is a radial or axial type unidirectional transmission device including a unidirectional bearing, clutch, or transmission mechanism.

15. A continuously variable transmission as claimed in claim 1, wherein said one of said two devices for engaging said continuously variable transmission device with either said input shaft (101) or said output shaft (103) is said second unidirectional transmission device (211).

16. A continuously variable transmission as claimed in claim 15, wherein said second unidirectional transmission device (211) is a unidirectional bearing, unidirectional clutch, or unidirectional radial or axial transmission structure installed between the CVT driving pulley and the input shaft (101).

17. A continuously variable transmission as claimed in claim 1, wherein said one of said two devices for engaging said continuously variable transmission device with either said input shaft (101) or said output shaft (103) is said torque limiting clutching device (212).

18. A continuously variable transmission as claimed in claim 17, wherein said torque limiting clutching device (212) is a sliding or clutch type radial or axial torque limiting device.

19. A continuously variable transmission as claimed in claim 1, wherein said high speed pulley train 202 and said low speed pulley train 102 include at least one of the following structures: a transmission chain; transmission gears that are in addition to the respective driving and driven gears; a friction pulley; a canvas belt, a steel belt, and a chain belt.

20. A continuously variable transmission as claimed in claim 1, wherein said high shift gear train (202) or said low shift gear train (102) includes a middle transmission pulley installed between respective said driving and driven pulleys.

* * * * *